(12) United States Patent
Maina et al.

(10) Patent No.: US 11,494,781 B2
(45) Date of Patent: Nov. 8, 2022

(54) BUYBACK PROVISION MECHANISM

(71) Applicant: International Business Machines Corporation, Armonk, NY (US)

(72) Inventors: Samuel Maina, Nairobi (KE);
Abdigani Diriye, Nairobi (KE);
Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 16/424,437

(22) Filed: May 28, 2019

(65) Prior Publication Data

US 2020/0380529 A1 Dec. 3, 2020

(51) Int. Cl.
| | |
|---|---|
| G06Q 30/00 | (2012.01) |
| G06Q 30/02 | (2012.01) |
| G06F 9/54 | (2006.01) |
| G06F 3/0482 | (2013.01) |

(Continued)

(52) U.S. Cl.
CPC ......... *G06Q 30/014* (2013.01); *G06F 3/0482* (2013.01); *G06F 9/542* (2013.01); *G06Q 10/087* (2013.01); *G06Q 30/0202* (2013.01); *G06Q 30/0206* (2013.01); *G06Q 50/30* (2013.01)

(58) Field of Classification Search
CPC .. G06Q 30/014; G06Q 30/0206; G06Q 50/30; G06Q 10/087; G06Q 30/0202; G06F 3/0482; G06F 9/542
See application file for complete search history.

(56) References Cited

U.S. PATENT DOCUMENTS

| | | |
|---|---|---|
| 6,847,938 B1 | 1/2005 | Moore |
| 7,590,463 B2 | 9/2009 | Degbotse et al. |

(Continued)

FOREIGN PATENT DOCUMENTS

| | | | |
|---|---|---|---|
| CA | 2612830 A1 | | 12/2006 |
| CN | 105069596 A | * | 11/2015 |
| JP | 2018180601 A | * | 11/2018 |

OTHER PUBLICATIONS

Ren, Jinyu, et al. "Coordinating a multi-retailer decentralized distribution system with random demand based on buyback and compensation contracts." Journal of Industrial Engineering and Management (JIEM) 8.1 (2015): 203-216. (Year: 2015).*

(Continued)

*Primary Examiner* — Jerry O'Connor
*Assistant Examiner* — Thomas Yih Ho
(74) *Attorney, Agent, or Firm* — Shimon Benjamin; Otterstedt & Kammer PLLC

(57) ABSTRACT

Methods and systems for buyback provisioning. A risk level for each of a plurality of items at risk of losing market value is computed and the plurality of items at risk of losing market value are differentiated based on the corresponding risk levels. An identity of candidate substitute items is learned by communicating with a distribution system and one or more of the candidate substitute items to exchange for one of the plurality of items are identified based on one or more contextual factors. An exchange of the item and at least one of the candidate substitute items is facilitated, the facilitating comprising highlighting the item on a graphical user interface to indicate that the item is losing value or is at risk of losing value.

13 Claims, 9 Drawing Sheets

(51) Int. Cl.
*G06Q 50/30* (2012.01)
*G06Q 10/08* (2012.01)

(56) References Cited

U.S. PATENT DOCUMENTS

| | | | |
|---|---|---|---|
| 7,720,708 B1* | 5/2010 | Elkins, II | G06Q 30/0207 705/14.23 |
| 7,853,462 B2 | 12/2010 | Dogan et al. | |
| 8,145,536 B1* | 3/2012 | Goel | G06Q 10/025 705/26.1 |
| 8,260,724 B2 | 9/2012 | Babaioff et al. | |
| 8,447,665 B1* | 5/2013 | Schoenharl | G06Q 10/087 705/28 |
| 8,719,109 B1 | 5/2014 | Elicin et al. | |
| 2004/0098318 A1 | 5/2004 | Furukawa | |
| 2006/0085210 A1 | 4/2006 | Owens | |
| 2006/0190416 A1 | 8/2006 | Himmelstein | |
| 2007/0276744 A1* | 11/2007 | Burke | G06Q 40/00 705/35 |
| 2008/0027836 A1 | 1/2008 | Chapin | |
| 2009/0132333 A1* | 5/2009 | Sheffer | G06Q 10/06315 705/7.25 |
| 2012/0084119 A1* | 4/2012 | Vandehey | G06Q 30/0202 705/7.31 |
| 2012/0203567 A1* | 8/2012 | Seul | G06Q 10/06315 705/2 |
| 2012/0303410 A1* | 11/2012 | Connors | G06Q 30/02 705/7.31 |
| 2013/0297448 A1 | 11/2013 | Lester et al. | |
| 2013/0339193 A1* | 12/2013 | Ricci | G06Q 10/087 705/26.81 |
| 2014/0122045 A1* | 5/2014 | Mewes | G06F 30/20 703/6 |
| 2014/0136089 A1* | 5/2014 | Hranac | G08G 1/096775 701/118 |
| 2014/0278595 A1 | 9/2014 | Werneke | |
| 2014/0304114 A1* | 10/2014 | Walker | G06Q 50/12 705/26.41 |
| 2015/0046299 A1* | 2/2015 | Yan | G06Q 10/087 705/28 |
| 2016/0034980 A1 | 2/2016 | Petrie et al. | |
| 2016/0094458 A1* | 3/2016 | Bostick | H04L 47/125 370/229 |
| 2016/0110733 A1* | 4/2016 | Ray | G06Q 30/0202 705/7.31 |
| 2016/0282132 A1* | 9/2016 | Bostick | G08G 1/012 |
| 2017/0039514 A1* | 2/2017 | Jones | G06Q 10/087 |
| 2017/0262873 A1* | 9/2017 | Atchley | G06Q 50/01 |
| 2018/0357595 A1* | 12/2018 | Rai | G06Q 10/087 |
| 2019/0012591 A1* | 1/2019 | Limsopatham | G06N 3/0427 |
| 2019/0266554 A1* | 8/2019 | Lin | G06Q 30/0202 |

OTHER PUBLICATIONS

Traykov, Meotdi, et al. "Using partial differential equations for pricing of goods and services." Scientific Annals of Economics and Business 63.2 (2016). (Year: 2016).*

Lee, Yumi, Sang Hwa Song, and Taesu Cheong. "The value of supply chain coordination under moral hazard: A case study of the consumer product supply chain." PLoS One 13.3 (2018): e0194043. (Year: 2018).*

Tibrewala, Rajen, Ravi Tibrewala, and P. L. Meena. "Buy-back policy for supply chain coordination: a simple rule." International Journal of Operational Research 31.4 (2018): 545-572. (Year: 2018).*

N. Burton, "Bartering In The Modern Day: How People Are Swapping Skills And Services . . . For Free." Jul. 20, 2015, [Accessed Jan. 31, 2018] https://www.forbes.com/sites/learnvest/2015/07/20/bartering-in-the-modern-day-how-people-are-swapping-skills-and-services-for-free/#7c0779c517ed pp. 1-5.

IBM Knowledge Center, "HomeSterling Order Management 9.5.0 . . . Inventory Console Screens." https://www.ibm.com/support/knowledgecenter/SS6PEW_9.5.0/com.ibm.help.giv.user.doc/user/r_InventorySummary.html [Accessed Jan. 31, 2018] pp. 1-5.

Anonymous, "Technique of identifying and ranking markdown candidates for retailers." IP.com Disclosure No. IPCOM000238008D, Publication Date: Jul. 25, 2014. cover plus pp. 1-12.

Anonymous, "Smart Commerce Mobility Using Region Profiles." IP.com Disclosure No. IPCOM000240347D, Publication Date: Jan. 25, 2015. cover plus pp. 1-5.

H. Sang, "A simulation-based approach for obtaining optimal order quantities of short-expiration date items at a retail store." In Proceedings of the Winter Simulation Conference (WSC '12). Winter Simulation Conference, Article 131, 12 pages, 2012.

J. Rappaz, "Bartering Books to Beers: A Recommender System for Exchange Platforms." In Proceedings of the Tenth ACM International Conference on Web Search and Data Mining (WSDM '17). ACM, New York, NY, USA, 505-514. 2017. pp. 505-514.

Z. Yu, "Ordering policy for two-phase deteriorating inventory system with changing deterioration rate," ICSSSM11, Tianjin, 2011, pp. 1-4.

Peter Mell and Timothy Grance, The NIST Definition of Cloud Computing, cover, pp. i-iii and 1-3, NIST Special Publication 800-145 Sep. 2011.

* cited by examiner

BUYBACK PROVISION MECHANISM

BACKGROUND

The present invention relates to the electrical, electronic and computer arts, and more specifically, to computerized data analysis systems.

Small scale retailers, predominantly those in developing countries, are often faced with the challenge of having slow moving inventory (SMI) within their stock-keeping unit (SKU). This may have the consequence of tying up both capital and retail/warehouse space. The former can present a major challenge to the retailers given that, in general, they often experience cash flow constraints. In situations where the stock has been purchased on credit, the tying up of capital can have an impact on their ability to make credit repayments.

Given that these retailers are often small-scale traders, they may not be able to afford to slash prices for sales as their margins are small on average. The retailers also often struggle when purchasing items for the first time given that they are not familiar with consumer demand and it often takes time to determine the economic order quantity (EOQ), the ideal order quantity that minimizes a seller's overall cost associated with purchasing and carrying stock.

When sellers offload slow moving inventory, it is common to keep a handful of items on hand so that they can continue to offer them for sale. For small scale retailers, the determination of this minimum quantity is also a challenge. There can also be pros and cons to keeping a handful of items on hand and, ultimately, that decision should be made based on a careful economic analysis.

SUMMARY

Principles of the invention provide techniques for buyback provisioning in, for example, retail trade. In one aspect, an exemplary method includes the step of computing a risk level for each of a plurality of items at risk of losing market value; differentiating the plurality of items at risk of losing market value based on the corresponding risk levels; communicating with a distribution system to learn an identity of candidate substitute items; identifying one or more of the candidate substitute items to exchange for one of the plurality of items based on one or more contextual factors; and facilitating an exchange of the item and at least one of the candidate substitute items, the facilitating comprising highlighting the item on a graphical user interface to indicate that the item is losing value or is at risk of losing value.

In one aspect, an apparatus comprises a memory, and at least one processor, coupled to said memory, and operative to perform operations comprising: computing a risk level for each of a plurality of items at risk of losing market value; differentiating the plurality of items at risk of losing market value based on the corresponding risk levels; communicating with a distribution system to learn an identity of candidate substitute items; identifying one or more of the candidate substitute items to exchange for one of the plurality of items based on one or more contextual factors; and facilitating an exchange of the item and at least one of the candidate substitute items, the facilitating comprising highlighting the item on a graphical user interface to indicate that the item is losing value or is at risk of losing value.

In one aspect, a non-transitory computer readable medium comprises computer executable instructions which when executed by a computer cause the computer to perform operations comprising: computing a risk level for each of a plurality of items at risk of losing market value; differentiating the plurality of items at risk of losing market value based on the corresponding risk levels; communicating with a distribution system to learn an identity of candidate substitute items; identifying one or more of the candidate substitute items to exchange for one of the plurality of items based on one or more contextual factors; and facilitating an exchange of the item and at least one of the candidate substitute items, the facilitating comprising highlighting the item on a graphical user interface to indicate that the item is losing value or is at risk of losing value.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

identifying items at risk of losing market value;

determining, based on contextual factors, candidate substitute items for the items at risk of losing market value;

facilitating an exchange of the items at risk of losing market value and the candidate substitute items;

determining a risk level for each of a plurality of items at risk of losing market value and differentiating the plurality of items based on the corresponding risk levels;

learning localized demand by mining data from a plurality of users;

analyzing and tracking external events (such as from social media) that cause an item to lose market value;

triggering a buyback process;

triggering alert notifications for a user and device regarding the buyback process;

providing communications between the systems of users, retailers, and distributors; and determining locations of suitable distributors for exchanging items at risk of losing market value and candidate substitute items.

These and other features and advantages of the present invention will become apparent from the following detailed description of illustrative embodiments thereof, which is to be read in connection with the accompanying drawings.

DETAILED DESCRIPTION

Figure 1:
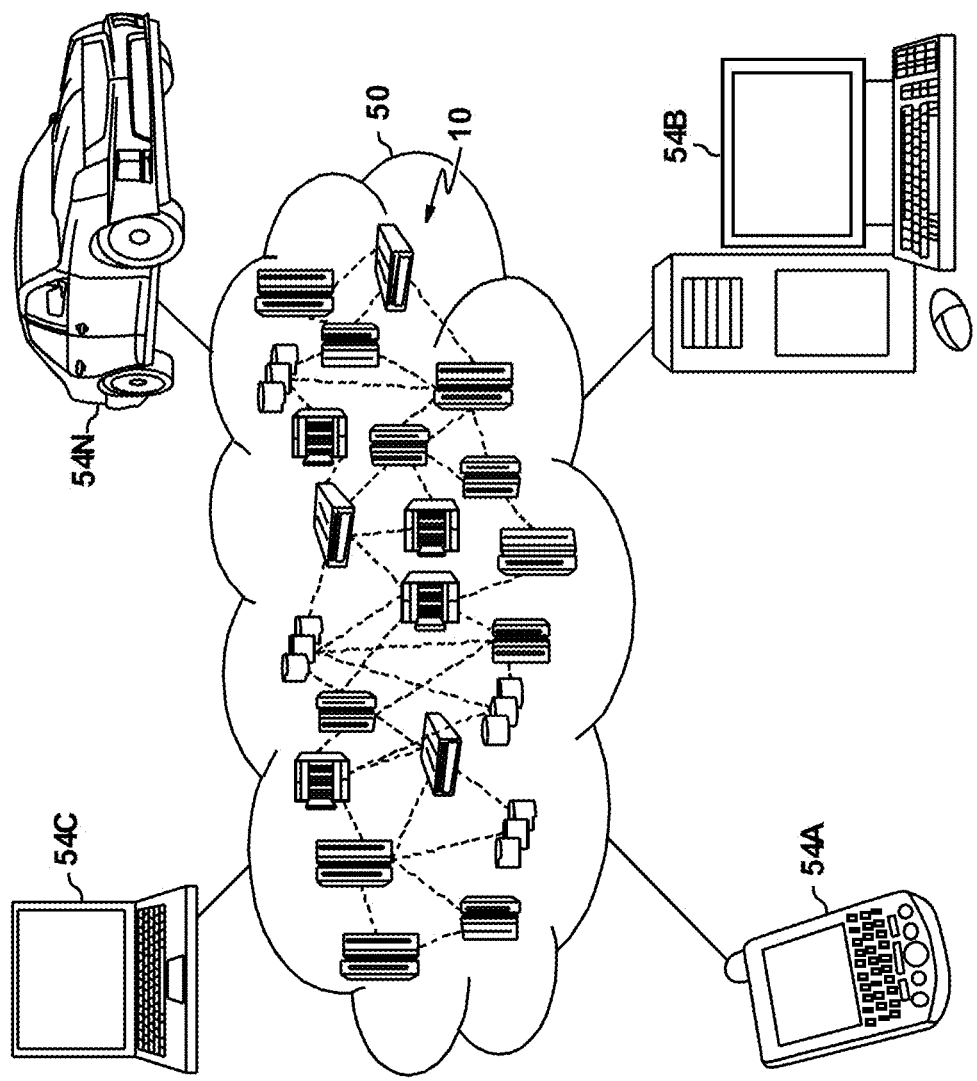
FIG. 1 depicts a cloud computing environment according to an embodiment of the present invention.

Generally, methods and systems for optimizing inventory management, determining economic order quantities, and performing buyback (such as retail buyback) are disclosed. In one example embodiment, a system and method are provided for detecting or predicting items at risk of losing market value, determining substitute items based on various contextual factors (such as demand forecast, weather, and the like) and initiating or facilitating an exchange of the items at risk of losing market value with the substitute items. In some cases, the exchange involves a certain cost/payment. In one example embodiment, the method of detecting items about to lose their market value is based on a plurality of data sources, communication devices, and computing devices (such as a point-of-sale (POS) device, a personal computer (PC), a tablet computer, a mobile device, a smart watch, and the like). The system may take into consideration the rate at which the purchased inventory is being sold, the time to the expiration of the buyback period, sales forecasts, contextual factors, and the like. Some embodiments can be implemented at least in part in the context of a cloud computing environment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
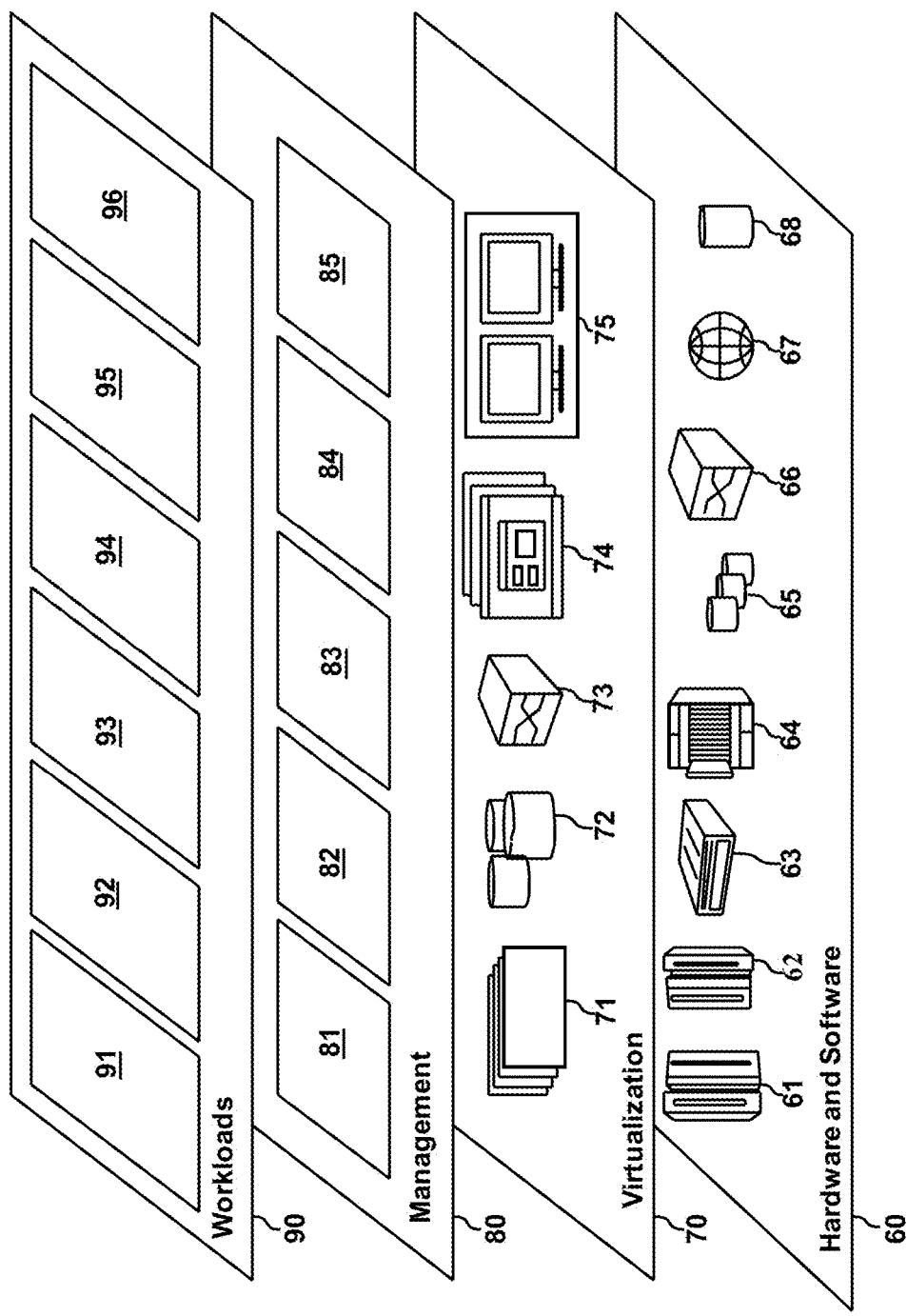
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a service 96 for provisioning buyback in retail trade.

Figure 3:
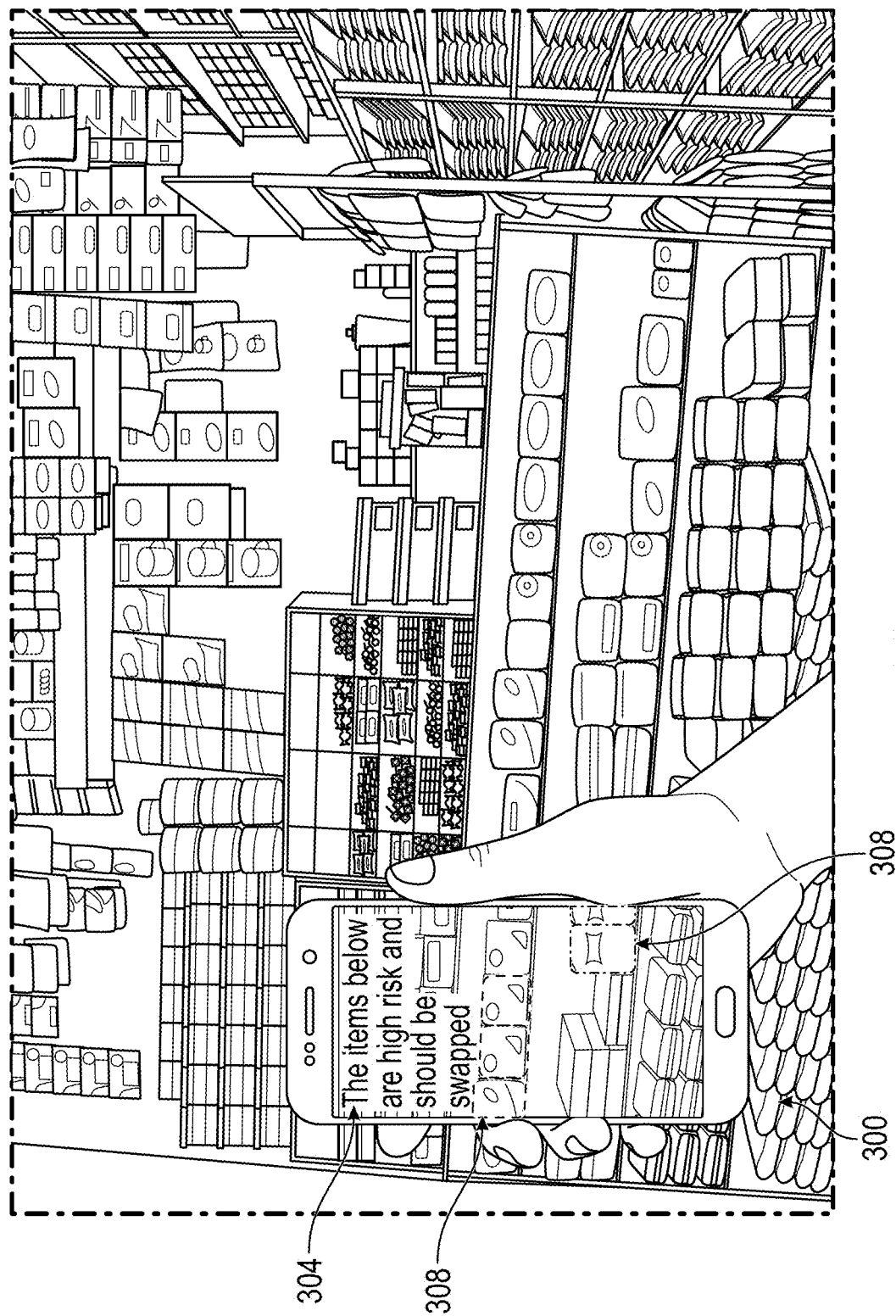
FIG. 3 is an illustration of using a computing device for locating and identifying items recommended for buyback in a retail environment, in accordance with an example embodiment.

FIG. 3 is an illustration of using a computing device 300 for locating and identifying items recommended for buyback in a retail environment, in accordance with an example embodiment. In one example embodiment, a user (such as a shop owner, retailer, and the like) can discover items at risk of losing market value via a list displayed on a computing device, via augmented reality, and the like. For example, the computing device 300 enables content and advisory text 304 to be superimposed on live images of items in a store to allow a user to discover the items at risk of losing market value. In one example embodiment, items are differentiated based on their risk level and the computing device 300 displays a visual indication 308 of the risk. For example, an item or group of items at a high risk of losing market value may be highlighted in red. This risk level of an item or group of items losing value is detected by analyzing the chrematistics of the item (i.e., characteristics of the item as they relate to the increase of wealth for the shop owner, such as shelf-life, freshness of the item, demand/supply of the item, and the like) and other external factors that may impact the item, for example, information obtained from crowdsourced data and social media data. In one example embodiment, the method of determining the impact is based on analyzing one or more events (such as an expected public gathering, road closures, and the like) obtained from social media websites, radio broadcasting, local news, and the like. In another example embodiment, the risk level of an item losing value may be predicted based on past historic events. The detected or predicted item is displayed to the user along with a suitable action(s) the user is to take, for example, to manually initiate the buyback process from the user interface directly. Based on the computed risk value (high, medium, low) for each item, the system shows the items on a graphical user interface (GUI) of the computing device 300 (e.g., a mobile phone or tablet computer) wherein each item is highlighted using a color-code (for example, red corresponds to HIGH risk, yellow indicates MEDIUM risk, and green indicates LOW or negligible risk of losing market value) on a dynamic GUI according to their risk values. In another embodiment, the highlighting of the items on the dynamic GUI can be accomplished by altering the size of the GUI elements of the corresponding items, altering the brightness of the color of the GUI element, and/or using other visual indicators, such as blinking a particular part of the GUI element corresponding to an item of high risk with a larger value as compared to other items with high risk to lose market value. In another embodiment, the highlighting of the GUI elements is performed by interchanging based on real-time evaluation of an event (such as, weather event, traffic conditions, crowd density, and the like) that may change the risk score of an item. In one example embodiment, an augmented reality-based view can be provided to the user.

In one example embodiment, the method of determining and triggering the exchange of the items at risk with the substitute items uses buyback provision cost functions where the buyback provision cost function takes into consideration various factors, such as the current price of the item, the buyback duration, prevailing government interest rates, the inflation rate, and the like, to determine the cost of purchasing the buyback provision that allows the return of the item(s). In performing the valuation, the system takes into consideration the fact that the retailer may have the right to return part or all the inventory to, for example, a distributor for a limited amount of time (such as any time before the buyback period lapses). The cost function can be a variant of the equation below. The value V of the buyback contract can be obtained by solving the following partial differential equation (the inequality sign comes into play given that V may not hold as the value of a strategy beyond a certain threshold; this is a representation of a partial differential equation with an early exercise provision):

$$\frac{\partial V}{\partial t} + rS\frac{\partial V}{\partial S} + \frac{1}{2}\sigma^2 S^2 \frac{\partial^2 V}{\partial S^2} - rV \leq 0$$

subject to some boundary conditions based on the variables S and K, $$V(S,T) \geq \max(S-K, 0)$$

where S is the initial selling price of the item, K is the buyback price, r is the prevailing treasury (annual) interest rate, t is the time, T is the end of the buyback program, and σ is a measure of uncertainty that captures, among other variables, the inflation rate. For example, the measure σ can be based on the inflation risk as reported by a reserve bank, a market index uncertainty index, and the like. In one example embodiment, the measure σ is set to one.

In one example embodiment, the system learns the localized demand for an item by mining data obtained from users via, for example, non-Internet based phones (such as short message service (SMS)), using text analytics, natural language processing, and the like. The method of detecting or predicting items at risk of losing their market value further includes the determination, via social media, of the impact of various events on demand. The impact determination is based, for example, on analyzing one or more events (such as an expected public gathering, road closures, and the like) obtained from social media websites, wherein the events may be deemed to affect the business of small-scale retailers based on past historic events. The method further monitors and evaluates social media for posts related to an event that has occurred or is about to occur. If an event indicates that it may affect the business of small-scale retailers for certain items, the system may automatically trigger the buyback process. For example, the system can trigger an alert notification via one or more computing devices informing the user to consider exercising the buyback option for emergency gear. Example of events that affect a small business include a weather event, traffic conditions, crowd density (e.g., unpredictable events near the area of the small business), and so on. In issuing the alert, the system also advises which items in the inventory (whether they are considered as fast moving or slow moving) qualify for an exchange provision. In one example embodiment, the alert is also sent to a distributor or distributor system via a shared platform or computing device with a recommendation to consider moving the product to a different location or nearby retailer where the product has evidence of being in demand.

The system can be configured to switch to a different communication technique based on available or preferred communication modalities (such as SMS, messaging applications such as WhatsApp, and the like). Substitute items that are requested for exchange can be ordered based on various conditions (such as an items expiry date, swapping profit-worthiness, a user defined priority, and the like). In one embodiment, the profit-worthiness can be computed by employing a dynamic programming algorithm which calculates the strategy of swapping an item while minimizing profit loss by taking into consideration various contextual factors (i.e., constraints), such as constraints like location, time, type of business, type of goods, weather condition, and the like.

In one example embodiment, rules and/or risk levels are defined that can be used to determine when to trigger the exchange process. The rules and/or risk levels can be specified by a user, such as a retailer, via a graphical user interface (GUI). The rules can also be learned or predicted based on historical data and a number of contextual factors (such as location, time, type of business, type of goods sold, weather, crowd density, and the like). In one example embodiment, an association rule mining algorithm can be trained to learn and identify an <item, swap> pair, and to indicate a rule suggesting when an item should be swapped. Contiguous Sequential Patterns algorithms can be used to further identify contextual factors associated with the rules. In one example embodiment, based on the defined rules and/or risk levels, a GUI, via a pop-up window, for example, identifies items losing or near to losing market value and items available to exchange, for example, with a nearby distributor, a nearby vehicle of a distributor, and the like.

In another embodiment, the system determines which items are slow moving and triggers a buyback option based, for example, on existing inventory, current sale volumes, and historical data. The data can be obtained from point-of-sale systems, from videos of customers interacting with items (such as picking up and putting down an item, looking at an item, and the like), customer enquiries on items, item information data sources (such as sources that provide information on items that are bought together (such as tea bags and milk) and types of customers purchasing items (such as millennials and teens)), and the like. Association rules based data mining techniques can be used to determine the association between items (e.g., buying milk with tea bags).

The disclosed system proposes items that are candidates for buyback provisioning in a number of ways. Buybacks for single items, a group of several items, complementary items (such as milk and tea bags), similar types or category of goods (such as meats and dairy), and the like can be recommended. These recommendations can be presented via a GUI, text SMS, voice, augmented reality applications, and the like.

In one example embodiment, a computing device, such as a user computing device, establishes a communication protocol for communicating with a device or system of a distributor to learn which items are available for exchanging. In one example embodiment, a request for a moving vehicle of a distributor is dynamically triggered to facilitate an exchange of the items. The request may be shown on a device or dashboard of the distributor to indicate that a request has been received to exchange items. The items or goods to be exchanged may also be shown on a GUI on a user computing device (such as a mobile phone or tablet computer) with buttons similar to automatic reordering buttons provided by online retailers. In one example embodiment, the user device may advertise an item(s) that are on sale via computing devices of users who are nearby or driving by a retail location.

Figure 4:
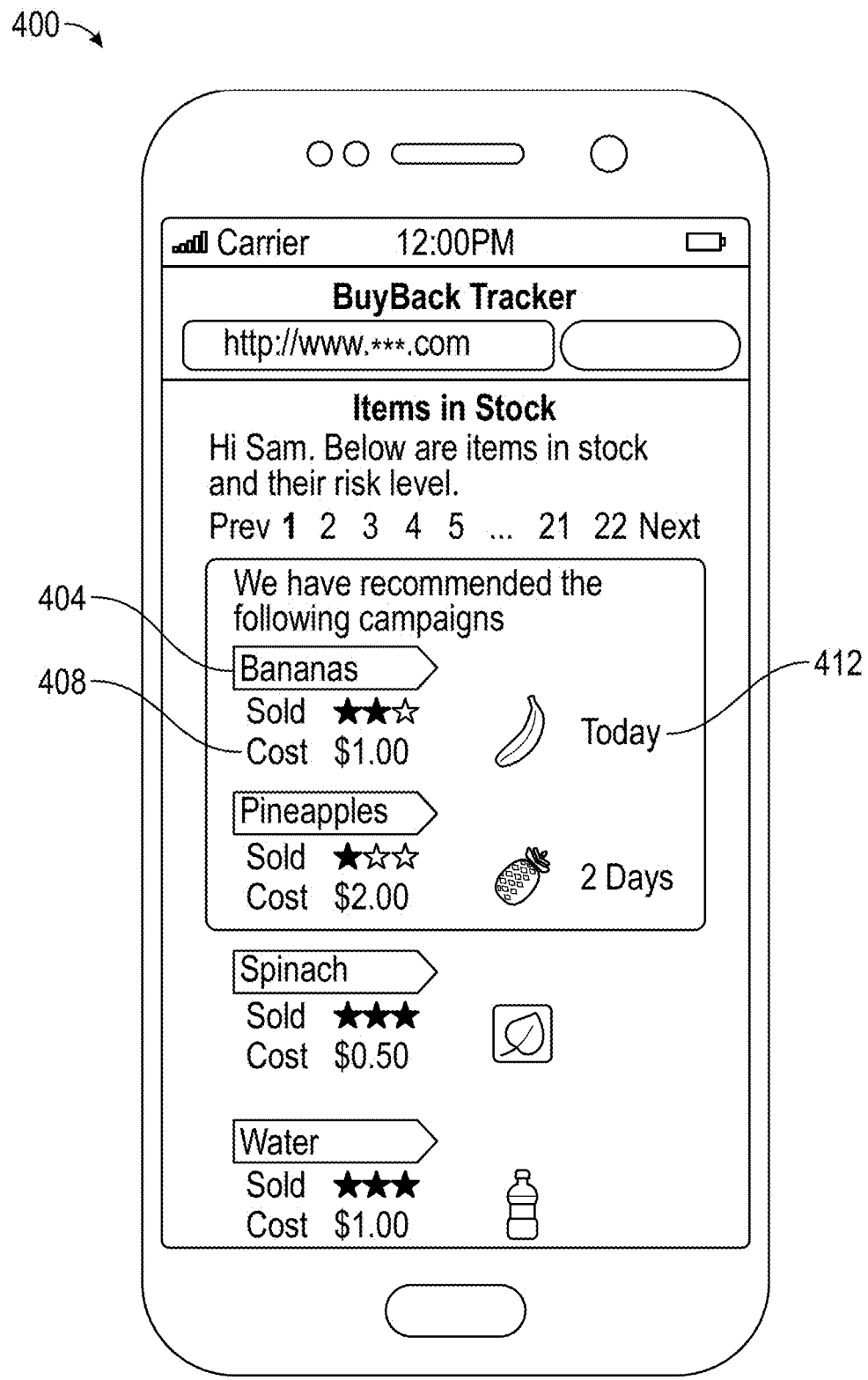
FIG. 4 is an illustration of a user interface for displaying items ranked in terms of priority of exchange, in accordance with an example embodiment.

FIG. 4 is an illustration of a user interface 400 for displaying items ranked in terms of priority of exchange, in accordance with an example embodiment. The identity 404, cost 408, time 412 to the end of the buyback period, and risk level are displayed for each item, where the position of the item in the list indicates the priority level. As described more fully above in conjunction with FIG. 3, the risk level of each item may be indicated using a color-code (for example, red corresponds to HIGH risk, yellow indicates MEDIUM risk, and green indicates LOW or negligible risk of losing market value).

Figure 5:
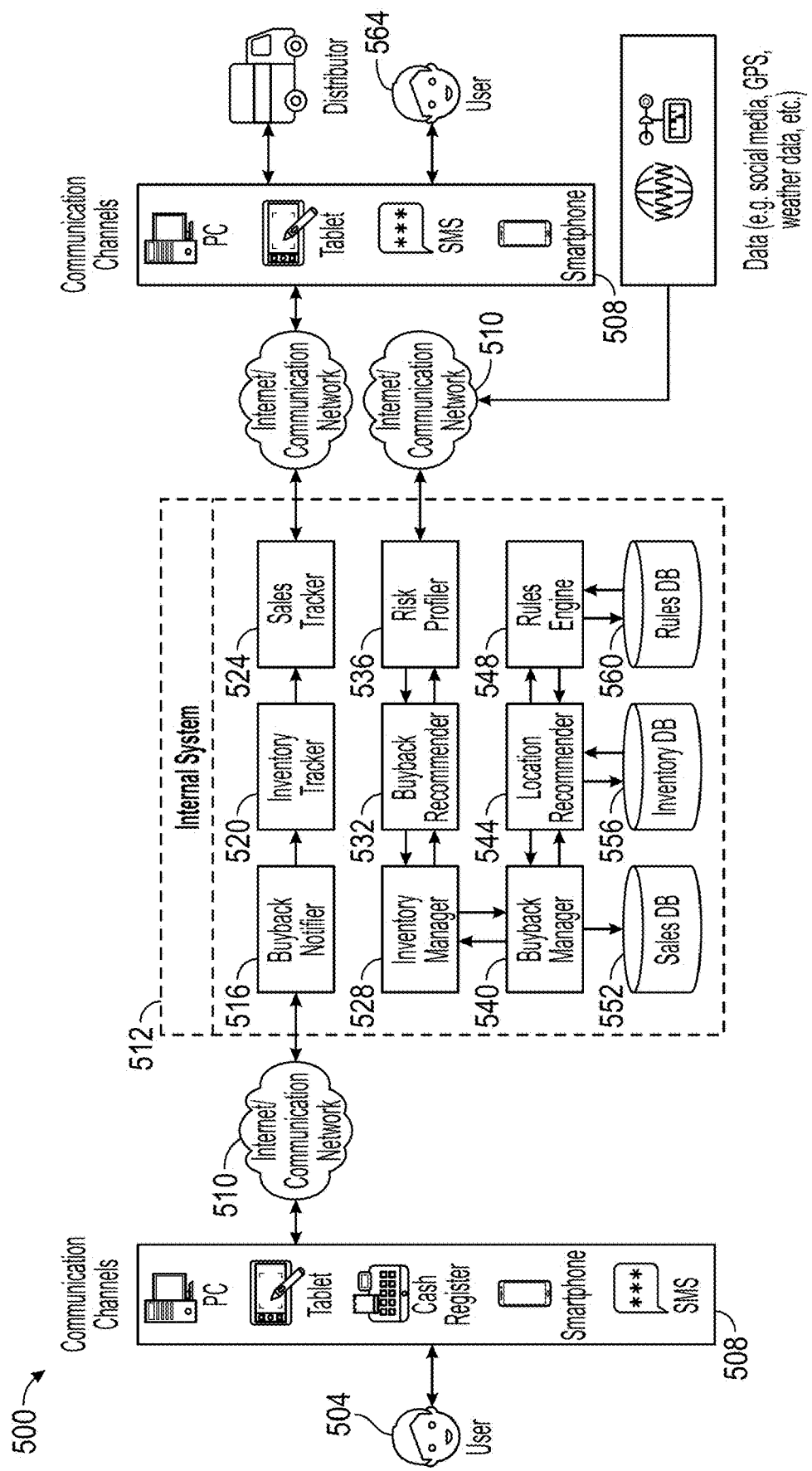
FIG. 5 is a block diagram of an example system for provisioning retail buyback, in accordance with an example embodiment.

FIG. 5 is a block diagram of an example system 500 for provisioning retail buyback, in accordance with an example embodiment. The system 500 receives data pertaining to goods, sales, weather, location, economic rates, and other data (including data from sources such as social media, online data, and the like) to determine items that will trigger a buyback recommendation. A user 504, 564 is able to interact with the system 500 via a plurality of devices 508 and communication mediums 510, such as a PC, a tablet computer, a point-of-sale terminal, a smartphone, and the like. This allows data pertaining to transactions and orders to flow into the internal system 512 while also notifying the user 504 of items that are candidates for buyback provisioning. The recommendations and communications are submitted to the user via the devices 508 and methods (such as voice, SMS, email, and the like).

In one example embodiment, the internal system 512 includes a buyback notifier 516, an inventory tracker 520, a sales tracker 524, an inventory manager 528, a buyback recommender 532, a risk profiler 536, a buyback manager 540, a location recommender 544, a rules engine 548, a sales database 552, an inventory database 556, and a rules database 560.

In one example embodiment, the buyback notifier 516 determines whether the item is at a high risk of losing or near to losing market value and a prime candidate for buyback provisioning. This may be implemented using a linear discriminate analysis (LDA), a classification algorithm (such as a support vector machine (SVM)), and the like. The buyback notifier 516 receives, for example, a buyback authorization from a retailer and alerts the inventory tracker 520. In one example embodiment, the buyback notifier 516 informs a user if an item is identified as high risk and is a prime candidate for buyback provisioning. The buyback notifier 516 also receives inventory and sales data from, for example, a POS system.

The inventory tracker 520 maintains the current and historical inventory of each item, including items that are losing or near losing market value. The inventory tracker 520 monitors the intrinsic value of items and whether items are losing or near losing market value by taking the difference of the current item's value and the latest market value, and discounts the result with the length of time the item has been in stock.

The sales tracker 524 tracks current sales of each item, including items that are losing or near losing market value.

In one example embodiment, the sales tracker 524 maintains historical sales data for each item.

The inventory manager 528 is responsible for relaying the state of the user's inventory to components such as the buyback recommender 523 (which analyzes items). The inventory manager 528 also updates the inventory when new items are added and/or organizes items according to when they would lose their market value.

The buyback recommender 532 obtains information from the inventory manager 528 and the risk profiler 536 and issues recommendations as to which items that are losing or near losing market value should be returned to a distributor and/or exchanged for substitute items.

The risk profiler 536 monitors sales of items and determines which items are losing or are at risk of losing market value.

The buyback manager 540 coordinates the buyback of items, such as items that are losing or near losing market value.

The location recommender 544 identifies, for example, a location of a suitable distributor for performing a buyback of the items that are losing or near losing market value.

The rules engine 548 is responsible for triggering the buyback operation and storing specific rules, for example, pertaining to when an item should be returned or exchanged further. The rules may be entered by a user via a GUI or learnt based on historical data and a use of a number of contextual factors (such as location, time, type of business, type of goods sold, weather, and the like).

The sales database 552 maintains current sales and historical sales data for each item. The inventory database 556 maintains current inventory levels and historical inventory levels for each item.

The rules database 560 maintains rules, such as rules defined by a user that specify a risk level for triggering the exchange process.

In one example embodiment, another user (such as a distributor) is notified of the items that are available for exchange and arrangements for pick-up and drop-off of the items are made. Sales and purchases are updated in the inventory database 556 so that the internal system 512 can perform the respective analysis and give the appropriate recommendations.

Figure 6A:
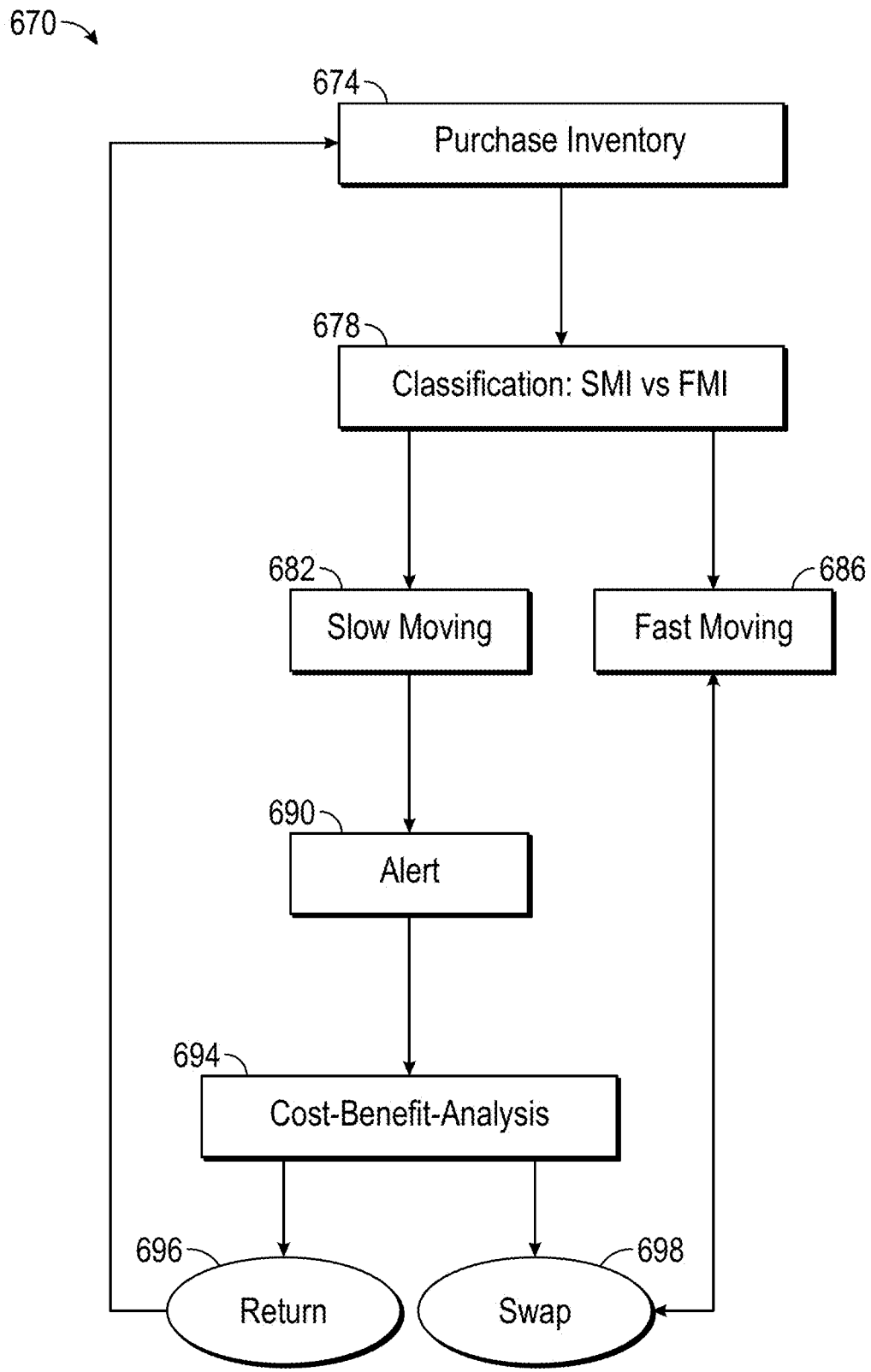
FIG. 6A a flowchart of an example workflow for provisioning buyback in retail trade, in accordance with an example embodiment.

FIG. 6A a flowchart of an example workflow 670 for provisioning buyback in retail trade, in accordance with an example embodiment. In one example embodiment, an inventory of items is purchased (operation 674). For example, items may be periodically purchased and received from a distributor, a manufacturer, and the like. The items in the inventory are classified (operation 678) into either slow moving items 682 or fast moving items 686. Other classifications, such as normal moving items (items being sold at a typical or expected rate) are also contemplated. In one example embodiment, the classification is based on variables like item turnover, holding/storage of the inventory/stock, and the like.

An alert is generated based on the slow moving items 682 (operation 690). For example, a user, such as a retailer, can be alerted to the identity of the slow moving items 682 along with data, such as the current inventory level of the item 682 and the sales rate of the item 682. A cost-benefit analysis, as described more fully above, is conducted (operation 694) to determine if one or more of the slow moving items 682 should be returned or swapped for other items. If an item 682 is to be returned, the manufacturer, distributor, and the like is notified and the items 682 are returned (operation 696). If an item 682 is to be swapped, the manufacturer, distributor, and the like is notified, a replacement item is identified, and the items 682 and the replacement items are swapped (operation 698). Fast moving items are held normally in inventory, in one or more embodiments.

Figure 6B:
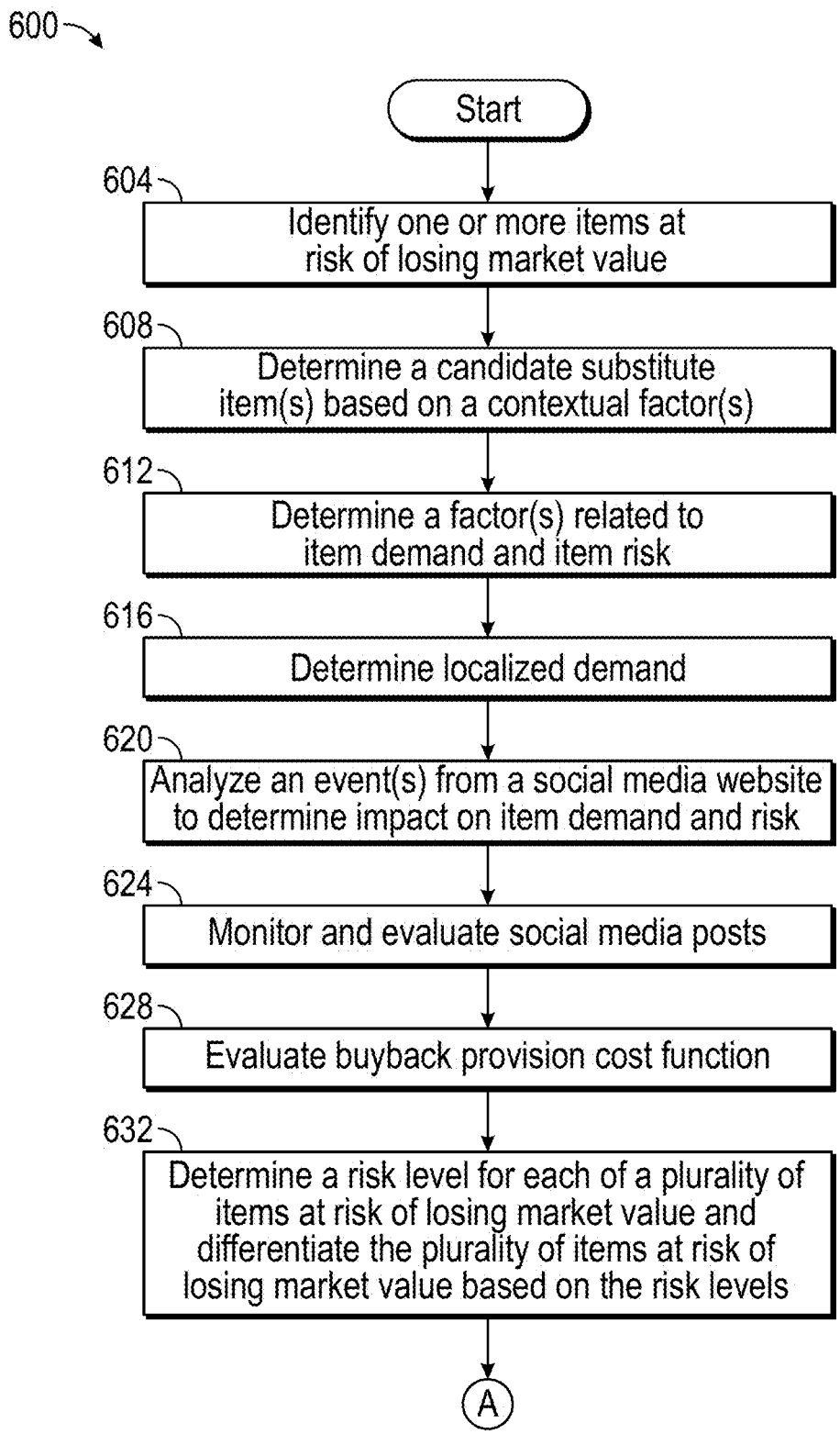
FIGS. 6B-6C are a flowchart of an example method for provisioning buyback in retail trade, in accordance with an example embodiment.
Figure 6C:
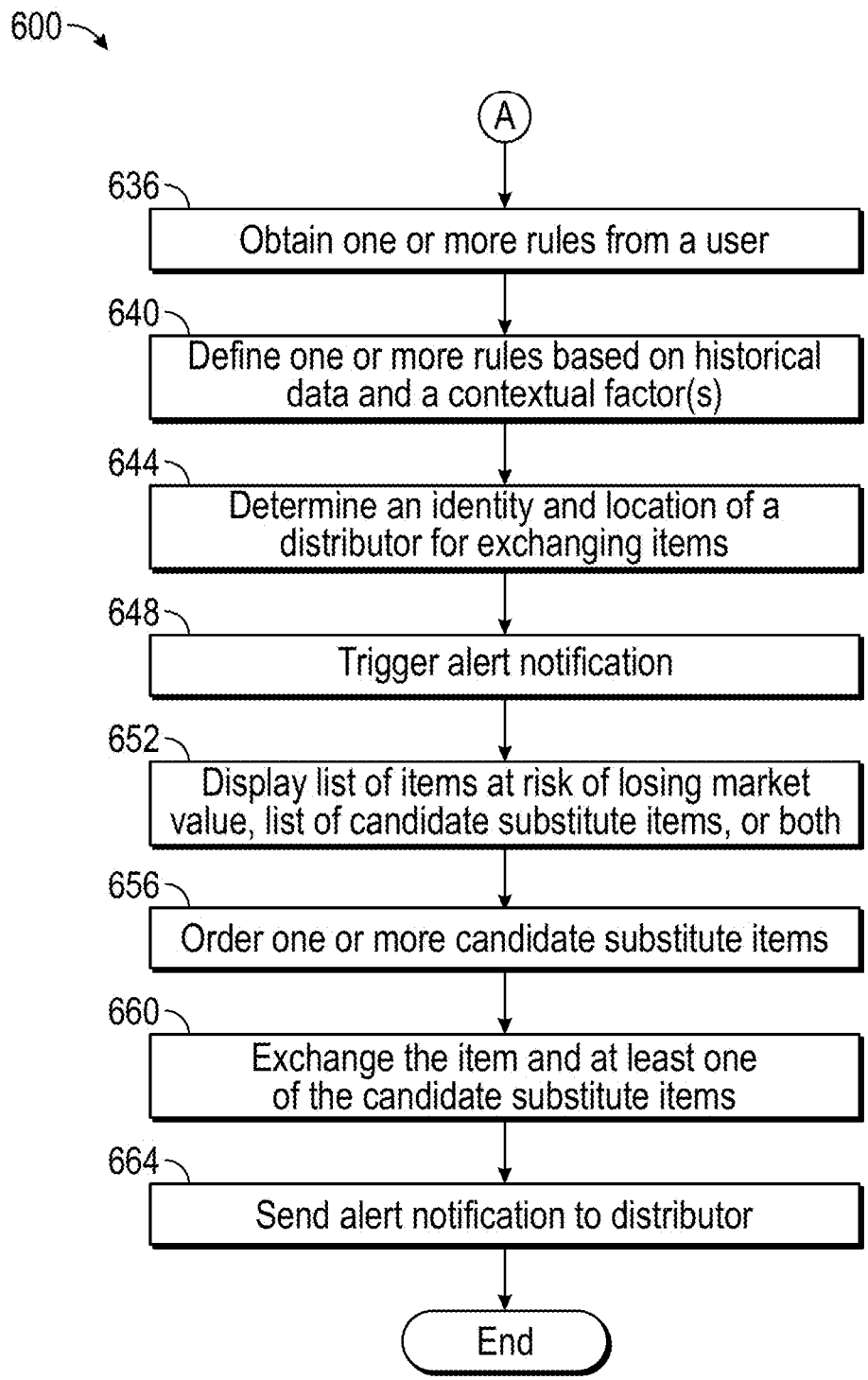

FIGS. 6B-6C are a flowchart of an example method 600 for provisioning buyback in retail trade, in accordance with an example embodiment. In one example embodiment, one or more items at risk of losing market value are identified (operation 604). For example, a forecasting technique, such as line regression and the like, or a time series forecasting method, such as autoregression, moving averages, seasonal autoregressive integrated moving-average, and the like, is used to identify the item(s) at risk of losing market value. One or more candidate substitute items are determined based on one or more contextual factors, such as a communication with a distributor system that identifies substitute items available for exchange (operation 608). In one example embodiment, a collaborative filtering algorithm is used to determine the candidate substitute items. Factors related to item demand and item risk are determined (operation 612). In one example embodiment, a correlation of the different features of each item is computed and a principal component analysis is used to find the most discriminative features. Localized demand is determined by mining data from a plurality of users (operation 616). In one example embodiment, unsupervised or semi-supervised techniques are used to determine the localized demand. One or more events from social media websites are analyzed to determine an impact of the event(s) on item demand and risk (operation 620). In one example embodiment, the impact is computed using sentiment analysis to quantify the social media data into a valency and is then classified based on the valency (where "valency" refers, for example, to valence within the social network; i.e., the degree of attractiveness an individual, activity, crowd-density, or object possesses as a behavioral goal). Social media posts (such as posts related to an event) are monitored and evaluated (operation 624). The one or more events may be, for example, events known to affect the business of small-scale retailers based on one or more past historic events.

In one example embodiment, a buyback provision cost function is evaluated, wherein the buyback provision cost function considers, for example, a current price of an item, a buyback duration, prevailing government interest rates, and an inflation rate (operation 628). A risk level for each of a plurality of items at risk of losing market value is determined and the plurality of items at risk of losing market value are differentiated based on their corresponding risk levels (operation 632). For example, a forecasting technique, such as line regression and the like, or a time series forecasting method, such as autoregression, moving averages, seasonal autoregressive integrated moving-average, and the like, is used to determine the item(s) at risk of losing market value. In one example embodiment, one or more rules are obtained from a user, each rule defining, for example, a risk level for triggering the exchange process (operation 636). For example, a user may enter and encode a rule such as: if the expiration time of the item is less than seven days from the present, then exchange the item. Each item may be assigned its own risk level. One or more rules are defined based on historical data and a number of contextual factors (operation 640). In one example embodiment, the contextual factors are one or more of a demand forecast, a weather report, a rate at which an inventory of the first item is being sold, a time to an expiration of a buyback period, a sales forecast, a location, an economic rate. The information regarding the contextual factors may be obtained from a plurality of data sources.

In one example embodiment, an identity and a location of a suitable distributor for exchanging the item(s) at risk of losing market value and a candidate substitute item(s) is determined (operation 644). In one example embodiment, an alert notification for a user is triggered, the alert notification recommending consideration of exercising a return option (operation 648). The alert notification may advise, for example, which items in an inventory qualify for an exchange provision. The triggering may be based, for example, on an event that indicates that the business of small-scale retailers may be affected, based on an existing stock of the item, a current sale volume, and historic data, and the like. A list of items at risk of losing market value, a list of candidate substitute items, or both is displayed for a user, such as a retailer (operation 652). Content and advisory text may, for example, be superimposed on a live image of the items in the store. A visual indication of the risk level associated with each of the items at risk of losing market value may also be displayed.

In one example embodiment, one or more candidate substitute items are ordered based on one or more of an item's expiry date, profit-worthiness, and a user defined priority (operation 656). The first item and at least one of the candidate substitute items are exchanged (operation 660). The exchange may include a payment for performing the exchange. In one example embodiment, an alert notification is sent to a distributor with a recommendation to consider moving the item at risk of losing market value to a different distributor and/or retail location (operation 664).

Given the discussion thus far, it will be appreciated that, in general terms, an exemplary method, according to an aspect of the invention, includes the step of computing a risk level for each of a plurality of items at risk of losing market value 632; differentiating the plurality of items at risk of losing market value based on the corresponding risk levels 632; communicating with a distribution system to learn an identity of candidate substitute items 608; identifying one or more of the candidate substitute items to exchange for one of the plurality of items based on one or more contextual factors 608; and facilitating an exchange of the item and at least one of the candidate substitute items, the facilitating comprising highlighting the item on a graphical user interface 400 to indicate that the item is losing value or is at risk of losing value 644-664.

In one example embodiment, the item and at least one of the candidate substitute items are exchanged 660. In one example embodiment, the contextual factors are one or more of a demand forecast, a weather report, crowd density, a rate at which an inventory of the item is being sold, a time to an expiration of a buyback period, a sales forecast, a location, and an economic rate. In one example embodiment, a localized demand is learned for a given item by mining data from a plurality of users 504, 564, 616. In one example embodiment, an impact of an event on item demand, a risk for the item, or both is determined by analyzing one or more events from social media websites 620.

In one example embodiment, social media is monitored and evaluated for one or more posts related to one of the events 624. In one example embodiment, a buyback process is triggered based on an event that indicates business of small-scale retailers may be affected 620, 628. In one example embodiment, the triggering is based on an existing stock of the item, a current sales volume of the item, and historic data regarding the item. In one example embodiment, a buyback provision cost function is evaluated 628, wherein the buyback provision cost function considers a current price of the item, a buyback duration, a prevailing government interest rate, and an inflation rate. In one example embodiment, one or more rules are obtained from a user, each rule defining a risk level for triggering an exchange process 636.

In one example embodiment, one or more rules are defined based on historical data and the one or more contextual factors 640. In one example embodiment, an alert notification is triggered for a user, the alert notification recommending exercise of a buyback option and identifying one or more items in an inventory that qualify for an exchange provision 648. In one example embodiment, an alert notification is sent to a distributor, the alert notification comprising a recommendation to consider moving the item at risk of losing market value to a different location 664. In one example embodiment, one or more of the candidate substitute items are ordered based on one or more of an item's expiry date, an item's profit-worthiness, and a user defined priority 656. In one example embodiment, an identity and location of a distributor are determined for exchanging the item at risk of losing market value and at least one of the one or more candidate substitute items 644.

In one example embodiment, a list of items at risk of losing market value, a list of the one or more candidate substitute items, or both are displayed 652. In one example embodiment, content and advisory text 304 are superimposed on a live image of the item at risk of losing market value in a store 652. In one example embodiment, a visual indication 308 of a risk level associated with each item at risk of losing market value is displayed 652.

In one aspect, an apparatus comprises a memory 28; and at least one processor 16, coupled to said memory 28, and operative to perform operations comprising: computing a risk level for each of a plurality of items at risk of losing market value 632; differentiating the plurality of items at risk of losing market value based on the corresponding risk levels 632; communicating with a distribution system to learn an identity of candidate substitute items 608; identifying one or more of the candidate substitute items to exchange for one of the plurality of items based on one or more contextual factors 608; and facilitating an exchange of the item and at least one of the candidate substitute items, the facilitating comprising highlighting the item on a graphical user interface 400 to indicate that the item is losing value or is at risk of losing value 644-664.

In one aspect, a non-transitory computer readable medium comprises computer executable instructions which when executed by a computer cause the computer to perform operations comprising: computing a risk level for each of a plurality of items at risk of losing market value 632; differentiating the plurality of items at risk of losing market value based on the corresponding risk levels 632; communicating with a distribution system to learn an identity of candidate substitute items 608; identifying one or more of the candidate substitute items to exchange for one of the plurality of items based on one or more contextual factors 608; and facilitating an exchange of the item and at least one of the candidate substitute items, the facilitating comprising highlighting the item on a graphical user interface 400 to indicate that the item is losing value or is at risk of losing value 644-664.

Figure 7:
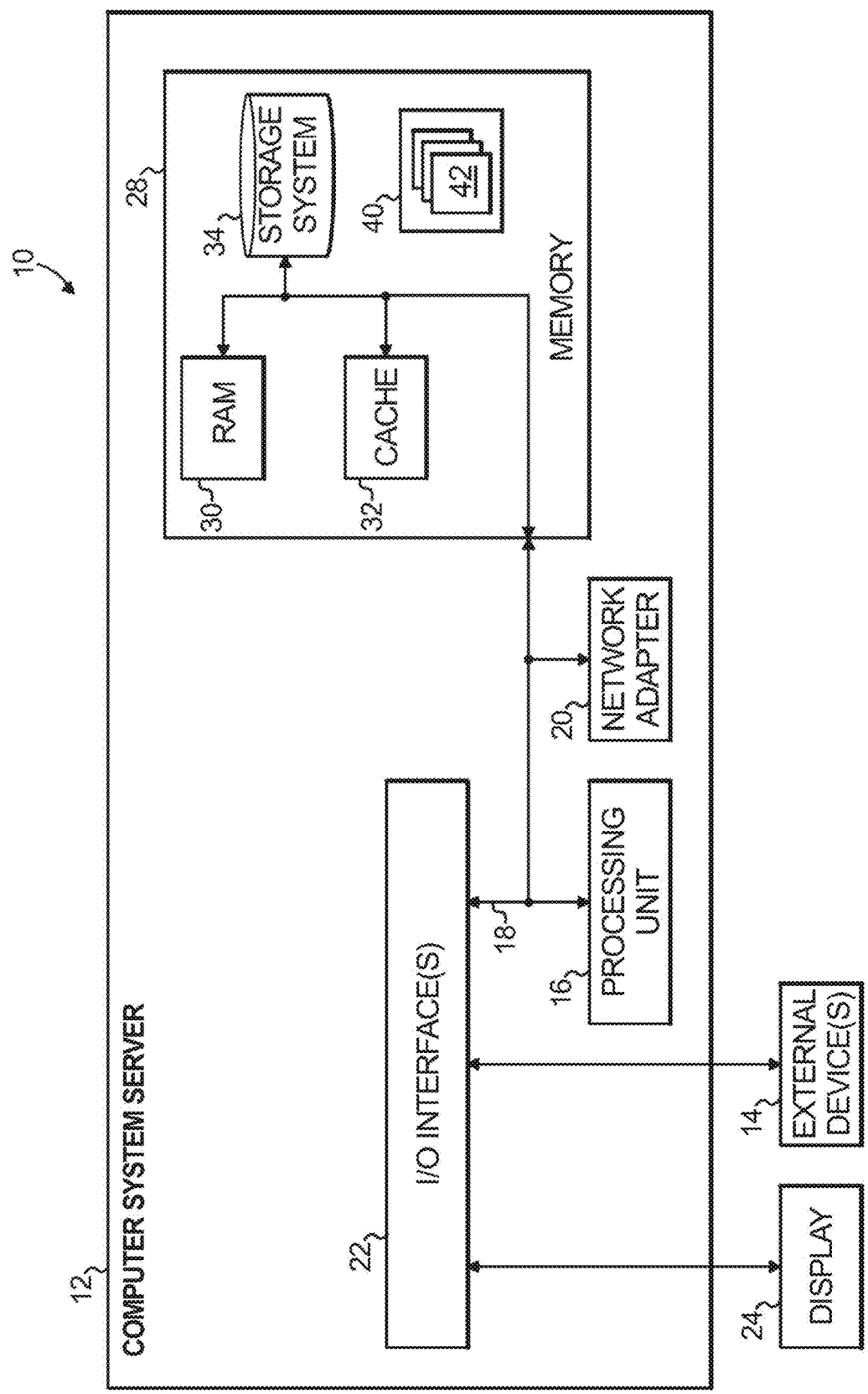
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described with regard to FIG. 5. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A method comprising:
   determining an impact of an event on item demand and a risk of losing item value by analyzing traffic conditions and weather events from social media websites, wherein the determination of the impact comprises performing sentiment analysis to quantify social media data into a valency and classifying the social media data based on the valency;
   computing a risk level for each of a plurality of items in a retailer inventory database at risk of losing market value;
   differentiating the plurality of items at risk of losing market value based on the corresponding risk levels;
   communicating with a distribution system to learn an identity of candidate substitute items for one or more items identified in the retailer inventory database;
   identifying one or more of the candidate substitute items to exchange for one of the plurality of items identified in the retailer inventory database based on one or more contextual factors;
   facilitating an exchange of the item and at least one of the candidate substitute items, the facilitating comprising highlighting the item in an image captured by and displayed on an electronic user device to indicate that the item is losing value or is at risk of losing value, wherein content and advisory text are superimposed on a live image of the item at risk of losing market value in a store;
   exchanging the item and at least one of the candidate substitute items;
   learning a localized demand for a given item by mining data from a plurality of users;
   determining the impact of the event on the risk for the item by analyzing one or more social media events from the social media websites;
   monitoring and evaluating social media for one or more posts related to one of the events;
   triggering a buyback process based on an event that indicates business of retailers may be affected; and
   evaluating a buyback provision cost function, wherein the buyback provision cost function considers a current price of the item, a buyback duration, a prevailing government interest rate, and an inflation rate, wherein the buyback provision cost function is a variant of a partial differential equation, wherein a value V of a buyback contract is obtained by solving the variant of the partial differential equation, wherein the partial differential equation is:

$$\frac{\partial V}{\partial t} + rS\frac{\partial V}{\partial S} + \frac{1}{2}\sigma^2 S^2 \frac{\partial^2 V}{\partial S^2} - rV \leq 0$$

subject to boundary conditions based on variables S and K, $$V(S,T) \geq \max(S-K,0)$$

where S is an initial selling price of an item, K is a buyback price, r is a prevailing interest rate, t is a time, T is an end of a buyback program, and σ is a measure of uncertainty.

2. The method of claim 1, wherein the contextual factors are one or more of a demand forecast, a weather report, crowd density, a rate at which an inventory of the item is being sold, a time to an expiration of a buyback period, a sales forecast, a location, and an economic rate.

3. The method of claim 1, wherein the triggering is based on an existing stock of the item, a current sales volume of the item, and historic data regarding the item.

4. The method of claim 1, further comprising obtaining one or more rules from a user of the plurality of users, each rule defining a risk level for triggering an exchange process.

5. The method of claim 1, further comprising defining one or more rules based on historical data and the one or more contextual factors.

6. The method of claim 1, further comprising triggering an alert notification for a user of the plurality of users, the alert notification recommending exercise of a buyback option and identifying one or more items in an inventory that qualify for an exchange provision.

7. The method of claim 1, further comprising sending an alert notification to a distributor, the alert notification comprising a recommendation to consider moving the item at risk of losing market value to a different location, and dynamically triggering a sending of a request for a moving vehicle to facilitate the exchange of the items.

8. The method of claim 1, further comprising ordering one or more of the candidate substitute items based on one or more of an item's expiry date, an item's profit-worthiness, and a user defined priority.

9. The method of claim 1, further comprising determining an identity and location of a distributor for exchanging the item at risk of losing market value and at least one of the one or more candidate substitute items.

10. The method of claim 1, further comprising displaying a list of items at risk of losing market value, a list of the one or more candidate substitute items, or both.

11. The method of claim 1, further comprising displaying a visual indication of a risk level associated with each item at risk of losing market value.

12. An apparatus comprising:
    a memory; and
    at least one processor, coupled to said memory, and operative to perform operations comprising:
    determining an impact of an event on item demand and a risk of losing item value by analyzing traffic conditions and weather events from social media websites, wherein the determination of the impact comprises performing sentiment analysis to quantify social media data into a valency and classifying the social media data based on the valency;
    computing a risk level for each of a plurality of items in a retailer inventory database at risk of losing market value;
    differentiating the plurality of items at risk of losing market value based on the corresponding risk levels;
    communicating with a distribution system to learn an identity of candidate substitute items for one or more items identified in the retailer inventory database;
    identifying one or more of the candidate substitute items to exchange for one of the plurality of items identified in the retailer inventory database based on one or more contextual factors;
    facilitating an exchange of the item and at least one of the candidate substitute items, the facilitating comprising highlighting the item in an image captured by and displayed on an electronic user device to indicate that the item is losing value or is at risk of losing value, wherein content and advisory text are superimposed on a live image of the item at risk of losing market value in a store;

exchanging the item and at least one of the candidate substitute items;

learning a localized demand for a given item by mining data from a plurality of users;

determining the impact of the event on the risk for the item by analyzing one or more social media events from the social media websites;

monitoring and evaluating social media for one or more posts related to one of the events;

triggering a buyback process based on an event that indicates business of retailers may be affected; and evaluating a buyback provision cost function, wherein the buyback provision cost function considers a current price of the item, a buyback duration, a prevailing government interest rate, and an inflation rate, wherein the buyback provision cost function is a variant of a partial differential equation, wherein a value V of a buyback contract is obtained by solving the variant of the partial differential equation, wherein the partial differential equation is:

$$\frac{\partial V}{\partial t} + rS\frac{\partial V}{\partial S} + \frac{1}{2}\sigma^2 S^2 \frac{\partial^2 V}{\partial S^2} - rV \leq 0$$

subject to boundary conditions based on variables S and K, $$V(S,T) \geq \max(S-K, 0)$$

where S is an initial selling price of an item, K is a buyback price, r is a prevailing interest rate, t is a time, T is an end of a buyback program, and $\sigma$ is a measure of uncertainty.

13. A non-transitory computer readable medium comprising computer executable instructions which when executed by a computer cause the computer to perform operations comprising:

determining an impact of an event on item demand and a risk of losing item value by analyzing traffic conditions and weather events from social media websites, wherein the determination of the impact comprises performing sentiment analysis to quantify social media data into a valency and classifying the social media data based on the valency;

computing a risk level for each of a plurality of items in a retailer inventory database at risk of losing market value;

differentiating the plurality of items at risk of losing market value based on the corresponding risk levels;

communicating with a distribution system to learn an identity of candidate substitute items for one or more items identified in the retailer inventory database;

identifying one or more of the candidate substitute items to exchange for one of the plurality of items identified in the retailer inventory database based on one or more contextual factors;

facilitating an exchange of the item and at least one of the candidate substitute items, the facilitating comprising highlighting the item in an image captured by and displayed on an electronic user device to indicate that the item is losing value or is at risk of losing value, wherein content and advisory text are superimposed on a live image of the item at risk of losing market value in a store;

exchanging the item and at least one of the candidate substitute items;

learning a localized demand for a given item by mining data from a plurality of users;

determining the impact of the event on the risk for the item by analyzing one or more social media events from the social media websites;

monitoring and evaluating social media for one or more posts related to one of the events;

triggering a buyback process based on an event that indicates business of retailers may be affected; and evaluating a buyback provision cost function, wherein the buyback provision cost function considers a current price of the item, a buyback duration, a prevailing government interest rate, and an inflation rate, wherein the buyback provision cost function is a variant of a partial differential equation, wherein a value V of a buyback contract is obtained by solving the variant of the partial differential equation, wherein the partial differential equation is:

$$\frac{\partial V}{\partial t} + rS\frac{\partial V}{\partial S} + \frac{1}{2}\sigma^2 S^2 \frac{\partial^2 V}{\partial S^2} - rV \leq 0$$

subject to boundary conditions based on variables S and K, $$V(S,T) \geq \max(S-K, 0)$$

where S is an initial selling price of an item, K is a buyback price, r is a prevailing interest rate, t is a time, T is an end of a buyback program, and $\sigma$ is a measure of uncertainty.

* * * * *